United States Patent
Takeuchi et al.

(10) Patent No.: US 6,675,609 B2
(45) Date of Patent: Jan. 13, 2004

(54) REFRIGERANT CYCLE SYSTEM WITH EJECTOR PUMP

(75) Inventors: Hirotsugu Takeuchi, Nagoya (JP);
Yasushi Yamanaka, Nakashima-gun (JP); Atsushi Inaba, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/350,779

(22) Filed: Jan. 23, 2003

(65) Prior Publication Data

US 2003/0140651 A1 Jul. 31, 2003

(30) Foreign Application Priority Data

| Jan. 30, 2002 | (JP) | ................................ | 2002-021544 |
| Nov. 13, 2002 | (JP) | ................................ | 2002-329666 |

(51) Int. Cl.$^7$ ................................................ F25B 1/06
(52) U.S. Cl. ........................................ 62/500; 62/197
(58) Field of Search ...................... 62/191, 278, 500, 62/511, 512, 86, 116, 197, DIG. 2

(56) References Cited

U.S. PATENT DOCUMENTS

| 3,701,264 A | * | 10/1972 | Newton ....................... 62/191 |
| 3,922,877 A | * | 12/1975 | Ophir et al. ................ 62/238.4 |
| 4,321,801 A | * | 3/1982 | Collard, Jr. ................ 62/238.4 |
| 4,342,200 A | * | 8/1982 | Lowi, Jr. ....................... 62/191 |
| 4,595,344 A | * | 6/1986 | Briley ......................... 417/185 |
| 5,343,711 A | * | 9/1994 | Kornhauser et al. .......... 62/116 |
| 5,740,681 A | * | 4/1998 | Karl ........................... 62/324.6 |
| 6,438,993 B2 | * | 8/2002 | Takeuchi et al. .............. 62/500 |
| 6,606,873 B2 | * | 8/2003 | Takeuchi ...................... 62/191 |

FOREIGN PATENT DOCUMENTS

| JP |   57-68456   |    | 10/1955 |
| JP |   49-132739  |    | 12/1974 |
| JP |   57-35256   |    | 2/1982  |
| JP |   60-147072  |    | 8/1985  |
| JP |  02002130874 A | * | 5/2002  |
| JP |  02002286326 A | * | 10/2002 |
| JP |  02003114063 A | * | 4/2003  |

\* cited by examiner

*Primary Examiner*—William C. Doerrler
*Assistant Examiner*—Mohammad M. Ali
(74) *Attorney, Agent, or Firm*—Harness, Dickey & Pierce, P.L.C.

(57) ABSTRACT

In a refrigerant cycle system with an ejector pump, refrigerant to be introduced into a nozzle of the ejector pump is heated in a heat exchanger using waste heat from a vehicle engine as a heating source, and any one of a first mode, a second mode and a third mode can be selectively set based on a thermal load of an evaporator. In the first mode, refrigerant circulates from the evaporator toward a radiator only by the ejector pump. In the second mode, refrigerant circulate from the evaporator toward the radiator only by a compressor. Further, in the third mode, refrigerant circulates from the evaporator toward the radiator by using both the ejector pump and the compressor. Accordingly, the waste heat can be effectively recovered while a flow resistance of the refrigerant can be restricted.

15 Claims, 9 Drawing Sheets

REFRIGERANT CYCLE SYSTEM WITH EJECTOR PUMP

CROSS-REFERENCE TO RELATED APPLICATION

This application is related to Japanese Patent Applications No. 2002-21544 filed on Jan. 30, 2002, and NO. 2002-329666 filed on Nov. 13, 2002, the contents of which are hereby incorporated by reference.

BACKGROUND OF THE INVENTION

1. Field of the Invention

The present invention relates to a refrigerant cycle system having an ejector pump that is used as a refrigerant pump for performing a refrigerant transportation by a refrigerant flow jetted at a high speed.

2. Description of Related Art

In a conventional refrigerant cycle system described in JP-A-49-132739, an ejector pump, which is operated using a refrigerant flow heated by waste heat as a driving source, is provided. Further, a compressor and the ejector pump are combined, so that consumption power of the compressor is reduced. However, the conventional system has the following problems (1)–(5).

(1) In the conventional system, the compressor and the ejector pump are connected simply in series in a refrigerant flow. Therefore, when the refrigerant circulates only by the ejector pump and the operation of the compressor is unnecessary, a refrigerant flow resistance is increased in the compressor, and recovery heat cannot be effectively used.

(2) When the conventional system is applied to a vehicle air conditioner where a vehicle engine is used as an exhaust heat source of the system, an exhaust heat amount of the vehicle engine becomes larger sometimes in accordance with a vehicle travelling state. In this case, the above-described problem (1) may be caused. When the compressor is not provided in order to solve this problem (1), the refrigerant circulation cannot be performed only by the ejector pump when the exhaust heat amount from the vehicle engine is small.

(3) In the conventional system, R114 or R12 is used as the refrigerant. However, there is not described any regarding a super-critical refrigerant cycle where the pressure of the refrigerant flowing into the ejector pump becomes higher than the critical pressure of the refrigerant.

(4) In the conventional system, because refrigerant flowing into an evaporator is decompressed and expanded in iso-enthalpy, the energy loss in the decompression and expansion cannot be recovered, and operation efficiency is reduced.

(5) In an electrical vehicle such as a hybrid vehicle and a fuel cell vehicle, it is necessary to cool a battery mounted on a vehicle. However, in the conventional system, there is not described any regarding an application to an electrical vehicle.

SUMMARY OF THE INVENTION

In view of the foregoing problems, it is the object of the present invention to provide a refrigerant cycle system with an ejector pump, which solves at least one of the above-described problems (1)–(5).

According to the present invention, a refrigerant cycle system includes an evaporator that has a cooling capacity by evaporating refrigerant therein, a radiator for cooling refrigerant flowing from the evaporator, an ejector pump including a nozzle and being disposed to suck refrigerant from a side of the evaporator and to discharge the sucked refrigerant toward the radiator by a refrigerant stream jetted from the nozzle, a compressor disposed to suck refrigerant from the side of the evaporator and to discharge the sucked refrigerant toward the radiator, and a heating unit for heating refrigerant to be introduced into the nozzle. In the refrigerant cycle system, the ejector pump and the compressor are disposed to select any one of a first mode where refrigerant circulates from the evaporator toward the radiator only by the ejector pump, a second mode where refrigerant circulates from the evaporator toward the radiator only by the compressor, and a third mode where refrigerant circulates from the evaporator toward the radiator by both the ejector pump and the compressor. Accordingly, any one of the first mode, the second mode and the third mode can be selectively set based on a thermal load of the evaporator and the like. For example, when the operation of the compressor is unnecessary, the refrigerant circulates only by the operation of the ejector pump. Further, when a heating degree of the heating unit is small, both the compressor and the ejector pump are operated so that operation efficiency of the refrigerant cycle system can be improved. Further, when the heating unit heats the refrigerant using waste heat such as engine-cooling water (hot water) from a vehicle engine as a heating source, the waste heat in the vehicle engine can be effectively recovered while a refrigerant flow resistance can be effectively reduced in the refrigerant cycle system. In the refrigerant cycle system, the compressor and the ejector pump can be disposed in series or in parallel, relative to a refrigerant flow from the evaporator to the radiator.

Preferably, the refrigerant cycle system further includes a switching valve for opening and closing a bypass passage through which refrigerant from the evaporator flows toward the radiator while bypassing the compressor. Therefore, when the operation of the compressor is unnecessary, refrigerant bypasses the compressor, and it can prevent the refrigerant flow resistance from being increased in the compressor.

In the refrigerant cycle system, the pressure the refrigerant flowing from the heating unit to the nozzle of the ejector pump can be set to be equal to or higher than the critical pressure of the refrigerant. In this case, the operation efficiency of the ejector pump can be effectively improved.

In the refrigerant cycle system of the present invention, the evaporator can be disposed to cool air to be blown into a compartment, for cooling the compartment. Alternatively, the evaporator can be disposed to cool a heat-generating member that generates heat when being operated. The heat-generating member can be a battery mounted on a vehicle.

According to the present invention, a refrigerant cycle system includes a first ejector pump and a second ejector pump. The first ejector pump includes a nozzle for converting a pressure energy of refrigerant to a speed energy thereof so that the refrigerant is decompressed and expanded, and is disposed to suck refrigerant from a side of the evaporator and to discharge the sucked refrigerant toward the radiator by a refrigerant stream jetted from the nozzle. On the other hand, the second ejector pump includes a nozzle for converting a pressure energy of refrigerant to a speed energy thereof so that the refrigerant flowing from the radiator toward the evaporator is decompressed and expanded, and a pressure-increasing portion in which the speed energy is converted to the pressure energy so that the pressure of refrigerant to be discharged is increased while refrigerant jetted from the nozzle and refrigerant sucked from the evaporator are mixed. Accordingly, energy loss in decompression and expansion can be effectively recovered, and operation efficiency can be further effectively improved.

According to the present invention, in a refrigerant cycle system, a gas refrigerant supplying unit is disposed for supplying gas refrigerant branched from the radiator to the heating unit. Therefore, it is unnecessary to use the waste heat for boiling and evaporating refrigerant in the heating unit, and large amount of heat can be recovered for performing pumping operation. Thus, the efficiency of the refrigerant cycle system can be effectively improved. Here, the gas refrigerant supplying unit can be constructed by a gas-liquid separator for separating refrigerant into gas refrigerant and liquid refrigerant, and a compressor for press-sending gas refrigerant supplied from the gas-liquid separator to the heating unit. Further, the radiator can include a first radiator and a second radiator which are connected through a refrigerant passage. In this case, the gas-liquid separator is connected to the refrigerant passage between the first radiator and the second radiator.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PREFERRED EMBODIMENTS

Preferred embodiments of the present invention will be described hereinafter with reference to the accompanying drawings.

Figure 1:
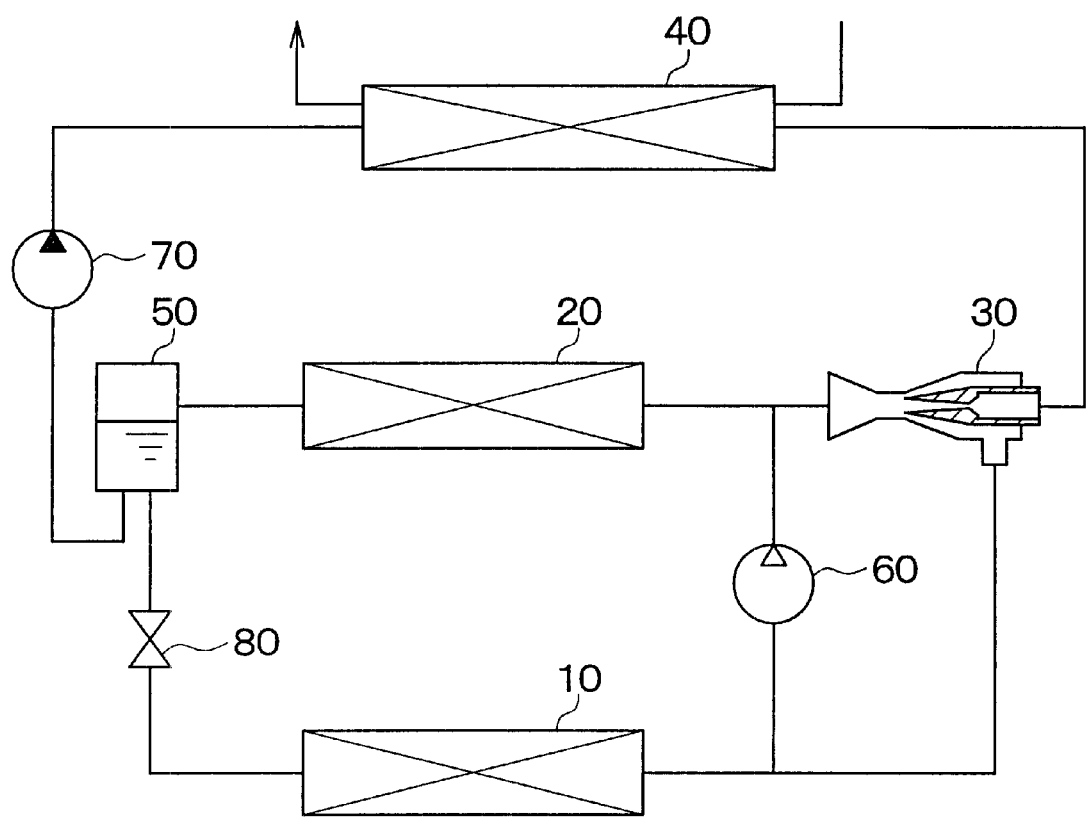
FIG. 1 is a schematic diagram showing a refrigerant cycle system having an ejector pump, according to a first preferred embodiment of the present invention.

A first preferred embodiment of the present invention will be now described with reference to FIGS. 1–5. In the first embodiment, a refrigerant cycle system having an ejector pump according to the present invention is typically used for a vehicle air conditioner. FIG. 1 shows the refrigerant cycle system. In the first embodiment, carbon dioxide is used as the refrigerant, for example.

In FIG. 1, an evaporator 10 is a low-pressure side heat exchanger in which refrigerant is evaporated by absorbing heat from air passing through the evaporator 10 so that air blown into a passenger compartment can be cooled. A radiator 20 is a high-pressure side heat exchanger which cools the refrigerant evaporated in the evaporator 10 by outside air.

Figure 2:
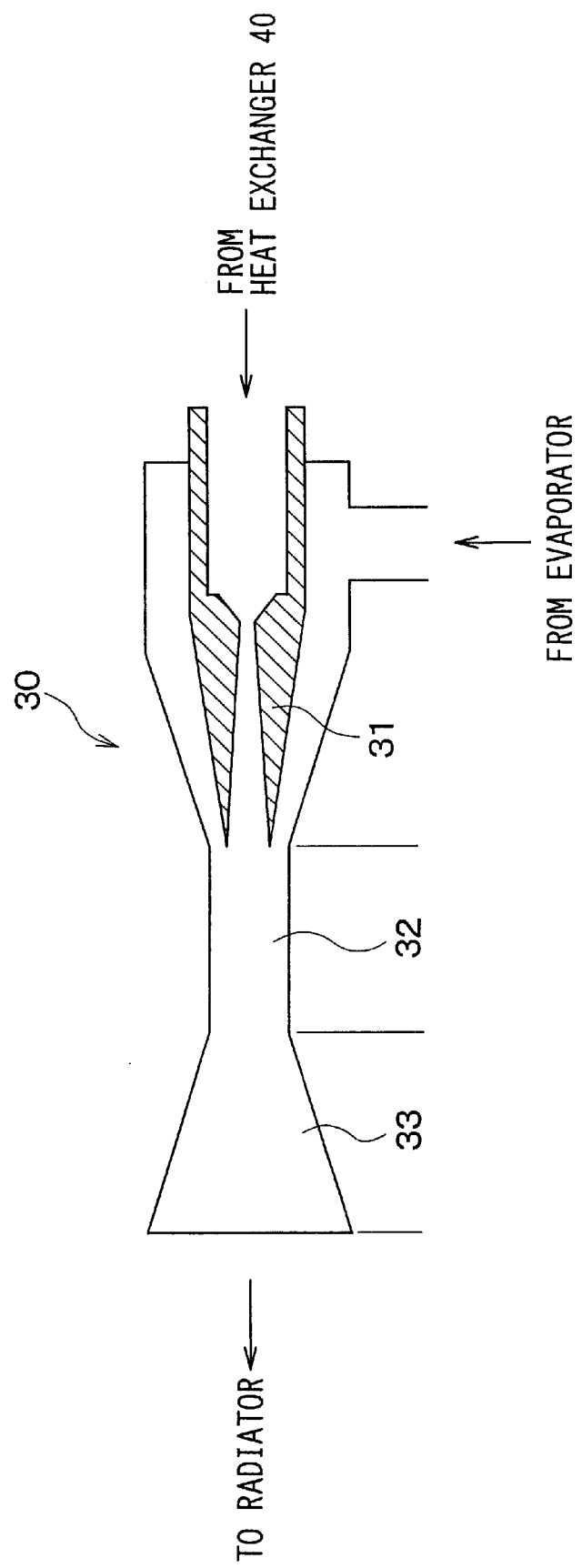
FIG. 2 is an enlarged schematic diagram showing the ejector pump used in the refrigerant cycle system according to the first embodiment.

An ejector pump 30 is a first pump that is used for circulating the refrigerant from the evaporator 10 toward the radiator 20, in the first embodiment. The ejector pump 30 sucks refrigerant from the evaporator 10 and discharges the sucked refrigerant toward the radiator 20. Specifically, as shown in FIG. 2, the ejector 30 includes a nozzle 31, a mixing portion 32 and a diffuser 33. The nozzle 31 decompresses and expands the refrigerant at the high pressure side by converting a pressure energy (pressure head) of the refrigerant to a speed energy (speed head) thereof. In the ejector pump 30, the refrigerant evaporated in the evaporator 10 at the low pressure side is sucked by high-speed refrigerant jetted from the nozzle 31. The refrigerant jetted from the nozzle 31 and the refrigerant sucked from the evaporator 10 are mixed in the mixing portion 32. Further, in the diffuser 33, the speed energy of refrigerant from the mixing portion 32 is converted to the pressure energy so that the pressure of refrigerant to be discharged is increased. In the first embodiment, because carbon dioxide is used as the refrigerant, the pressure of refrigerant flowing into the nozzle 31 can be increased to be equal to or higher than the critical pressure of the refrigerant.

In the ejector pump 30, because the refrigerant pressure is increased not only in the diffuser 33, but also in the mixing portion 32, a pressure-increasing portion is constructed by both the mixing portion 32 and the diffuser 33. In the first embodiment, a cross-sectional area of the mixing portion 32 is made constant until the diffuser 33. However, the mixing portion 32 may be tapered so that the cross-sectional area becomes larger toward the diffuser 33. The nozzle 31 has a throttle portion at which the passage sectional area is reduced in maximum.

As shown in FIG. 1, an exhaust-heat heat exchanger 40 is disposed to perform a heat exchange between refrigerant and engine-cooling water (i.e., engine exhaust heat) from a vehicle engine. That is, the heat exchanger 40 is a heating unit for heating the refrigerant flowing into the nozzle 31 of the ejector pump 30 using the engine-cooling water as a heating source. Refrigerant discharged from the radiator 20 flows into a gas-liquid separator 50, to be separated into gas refrigerant and liquid refrigerant in the gas-liquid separator 50. Liquid refrigerant in the gas-liquid separator 50 is supplied toward the heat exchanger 40 and the evaporator 10.

In the heat exchanger 40 of the first embodiment, the engine-cooling water and the refrigerant are heat-exchanged while flowing reversely in the flow directions or while flowing to be crossed approximately perpendicularly in the flow directions.

In the first embodiment, the compressor 60 is operated by power from the vehicle engine through a power transmission member such as a clutch, which transmits power interruptively. The compressor 60 is a second pump that is used for circulating the refrigerant from the evaporator 10 toward the radiator 20. The compressor 60 sucks the refrigerant from the evaporator 10 and discharges the sucked refrigerant toward the radiator 20. Further, a refrigerant pump 70 is disposed for circulating the liquid refrigerant in the gas-liquid separator 50 to the heat exchanger 40. The refrigerant pump 70 is a third pump, in the first embodiment.

A decompression unit 80 is disposed in a refrigerant passage connecting the gas-liquid separator 50 and the evaporator 10 to decompress refrigerant in iso-enthalpy. In the first embodiment, a thermal expansion valve is used as the decompression unit 80, so that a super-heating degree at a refrigerant outlet of the evaporator 10 becomes a predetermined value.

Next, operation of the refrigerant cycle system according to the first embodiment will be now described.

In the first embodiment, both the ejector pump 30 and the compressor 60 have the pump function for circulating the refrigerant from the evaporator 10 to the radiator 20 in the refrigerant cycle system. For example, when the compressor 60 is stopped and the refrigerant pump 70 is operated, a first mode is set so that only the ejector 30 has the pump function for circulating the refrigerant from the evaporator 10 to the radiator 20. When the refrigerant pump 70 is stopped and the compressor 60 is operated, a second mode is set so that only the compressor 60 has the pump function for circulating the refrigerant from the evaporator 10 to the radiator 20. When both the compressor 60 and the refrigerant pump 70 are operated, a third mode is set so that both the ejector pump 30 and the compressor 60 have the pump function for circulating the refrigerant from the evaporator 10 to the radiator 20.

Figure 3:
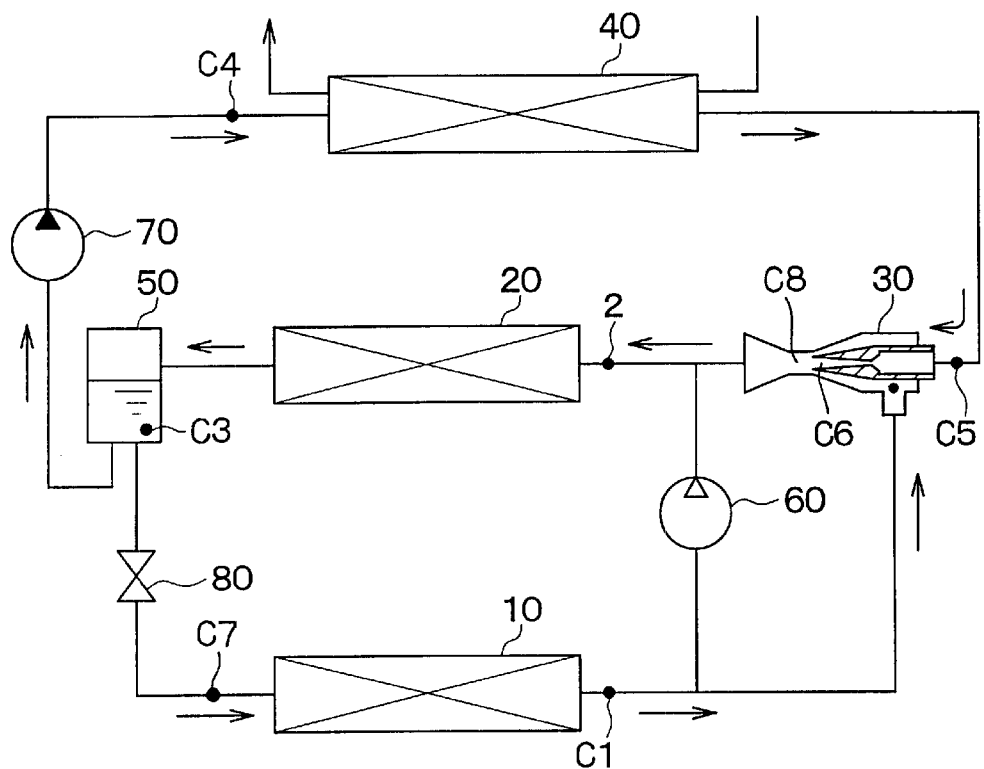
FIG. 3 is a schematic diagram showing a refrigerant flow of the refrigerant cycle system in a first mode according to the first embodiment.

When the compressor 60 is stopped and the refrigerant pump 70 is operated, the first mode is set and only the ejector 30 has the pump function. In the first mode, as shown in FIG. 3, refrigerant flows through the gas-liquid separator 50, the refrigerant pump 70, the heat exchanger 40, the ejector pump 30, the radiator 20 and the gas-liquid separator 50 in this order, while refrigerant flows through the gas-liquid separator 50, the decompression unit 80, the evaporator 10, the ejector pump 30, the radiator 20 and the gas-liquid separator 50 in this order. That is, the refrigerant cycle system forms a driving refrigerant circuit where the heated refrigerant from the exhaust-heat exchanger 40 flows through the nozzle 31 of the ejector pump 30 to be jetted from the nozzle 31, and a suction refrigerant circuit where refrigerant is sucked into the ejector pump 30 from the evaporator 10.

Figure 4:
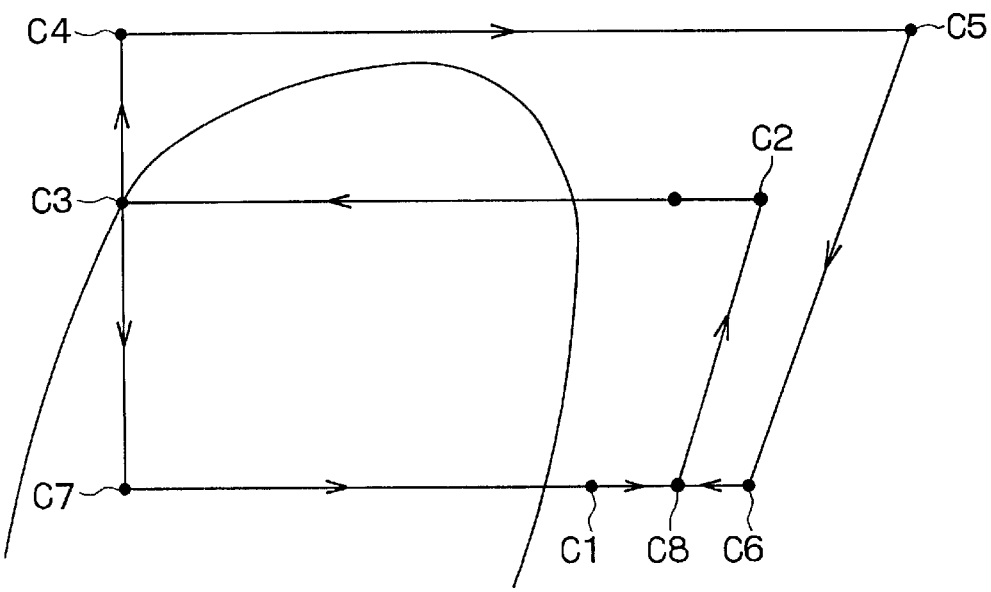
FIG. 4 is a Mollier diagram (p-h diagram) showing an operation of the refrigerant cycle system according to the first embodiment.

FIG. 4 is a p-h diagram showing the refrigerant flow in the refrigerant cycle system in the first mode where the compressor 60 is stopped and the ejector 30 has the pump function. In FIG. 4, the reference numbers C1, C2 . . . C8 show refrigerant states corresponding to the number positions in FIG. 3.

In the driving refrigerant circuit of the first mode, the refrigerant pump 70 increases the refrigerant pressure to a degree so that refrigerant can sufficiently circulate to the heat exchanger 40. Refrigerant flowing into the heat exchanger 40 absorbs waste heat from the engine-cooling water, so that the enthalpy of refrigerant to be introduced into the nozzle 31 of the ejector pump 30 is increased. Refrigerant flowing into the nozzle 31 of the ejector 30 is decompressed and expanded in iso-enthalpy. That is, the ejector pump 30 performs the pumping operation corresponding to an enthalpy amount lowered in the nozzle 31.

The enthalpy of the refrigerant is increased while flowing through the heat exchanger 40. Because the refrigerant pump 70 sucks mainly liquid refrigerant from the gas-liquid separator 50 and supplies the sucked refrigerant to the heat exchanger 40. Therefore, heat energy supplied to the refrigerant from the engine-cooling water in the heat exchanger 40 is consumed for boiling and evaporating the liquid refrigerant, and for further heating the boiled refrigerant.

On the other hand, among the heat energy given to the refrigerant in the heat exchanger 40, a recovering energy amount capable of recovering as the pumping operation (mechanical energy) is an energy amount subtracting an internal energy U from the enthalpy H (i.e., $H=U+pV$). That is, the recovering energy amount is the energy amount $pV$ consumed for further heating the boiled refrigerant.

Thus, for increasing the recovering energy amount from the waste heat in the heat exchanger 40, it is better to circulate gas refrigerant into the heat exchanger 40 than the liquid refrigerant. However, if the gas refrigerant sucked from the gas-liquid separator 50 is supplied to the heat exchanger 40, the gas refrigerant is compressed in the refrigerant pump 70, and the temperature of refrigerant flowing into the heat exchanger 40 is increased. Therefore, a temperature difference between the refrigerant and the engine-cooling water that is an exhaust heat source becomes smaller in the heat exchanger 40, and heat amount supplied to the refrigerant from the engine-cooling water becomes smaller. Accordingly, the pumping amount capable of recovering from the waste heat of the engine-cooling water is reduced.

In addition, when the gas refrigerant is compressed in the refrigerant pump 70, a pump efficiency of the refrigerant pump 70 is deteriorated, as compared with the case where the liquid refrigerant is sucked and compressed in the refrigerant pump 70. Here, the pump efficiency is a ratio of a mass flow amount of the refrigerant circulated by the refrigerant pump 70 to the energy supplied to the refrigerant pump 70. In the first embodiment, the refrigerant pump 70 is constructed to mainly supply liquid refrigerant from the gas-liquid separator 50 to the heat exchanger 40.

Next, when the refrigerant pump 70 is stopped and the compressor 60 is operated, the second mode is set so that only the compressor 60 has the pump function. In this case, the refrigerant cycle system is operated similarly to a general vapor-compression refrigerant cycle. Therefore, in the second mode, the refrigerant state is changed in this order of C1→C2→C3→C7→C1 in FIG. 4. Alternatively, in the second mode, the refrigerant state is changed in this order of C1→C6→C5→C4→C3→C7→C1.

When both the compressor 60 and the refrigerant pump 70 are operated, the third mode is set so that both the ejector pump 30 and the compressor 60 have the pump function. Therefore, in the third mode, the refrigerant cycle system is operated in the combination of the first and second modes. In the third mode, refrigerant in the evaporator 10 is sucked by both the compressor 60 and the ejector pump 30.

FIG. 4 shows one operation example in the refrigerant cycle system, and the relationship between the refrigerant pressure and the refrigerant temperature is not limited to the relationship shown in FIG. 4. For example, in FIG. 4, the pressure of refrigerant flowing into the nozzle 31 of the ejector pump 30 is set to be equal to or higher than the critical pressure of the refrigerant (e.g., carbon dioxide). However, the refrigerant pressure flowing into the nozzle 31 of the ejector pump 31 can be changed based on the outside air temperature or the cooling capacity required in the evaporator 10. When the outside air temperature decreases, air-conditioning load decreases, and the pressure in the radiator 20 decreases. Therefore, when the pumping amount capable of recovering from the ejector pump 30 is set to be constant, the flow amount of refrigerant flowing through the evaporator 10 can be increased.

Figure 5:
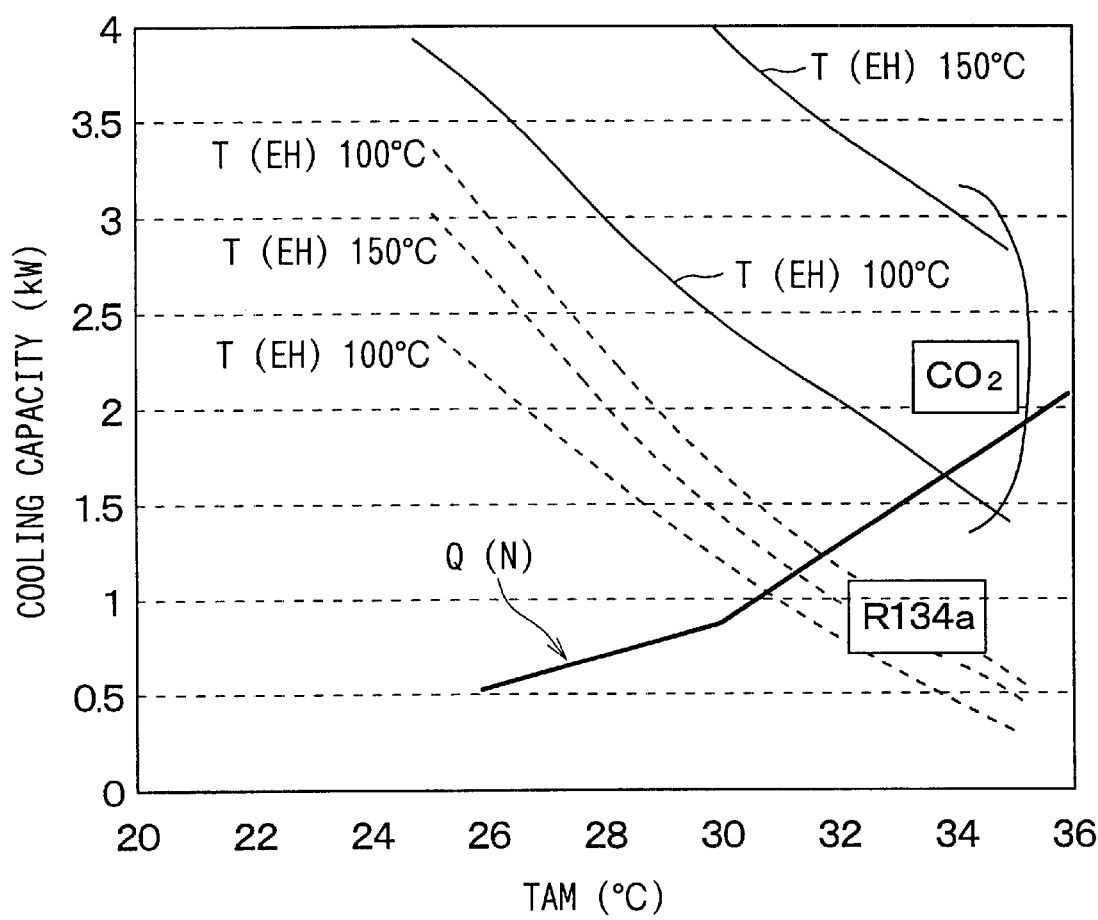
FIG. 5 is a graph showing the relationship between an outside air temperature TAM and a cooling capacity of the refrigerant cycle system, according to the first embodiment.

FIG. 5 shows the relationship between the outside air temperature TAM and the cooling capacity generated in the evaporator 10 when the waste heat temperature T(EH) is used as a parameter. In FIG. 5, Q(N) indicates a necessary cooling capacity in the vehicle air conditioner. As shown in FIG. 5, in the case where the carbon dioxide is used as the refrigerant, when the waste heat temperature T(EH) is equal to or higher than 150° C., a cooling capacity more than the necessary cooling capacity can be obtained only by the operation of the ejector pump 30. FIG. 5 shows two cases where carbon dioxide (CO2) is used as the refrigerant and R134a is used as the refrigerant.

According to the first embodiment, any one of the first mode, the second mode and the third mode can be automatically selected based on the air conditioning load (outside air temperature TAM) and the necessary cooling capacity in the vehicle air conditioner. In the first mode, refrigerant circulates from the evaporator 10 toward the radiator 20 only by the operation of the ejector pump 30. In the second mode, refrigerant circulates from the evaporator 10 toward the radiator 20 only by the operation of the compressor 60. Further, in the third mode, refrigerant circulates from the evaporator 10 toward the radiator 20 by both the compressor 60 and the ejector pump 30. Accordingly, when the operation of the compressor 60 is unnecessary, refrigerant bypasses the compressor 60, so that it can prevent the refrigerant flow resistance from being increased in the compressor 60. Further, because any one of the first mode, the second mode and the third mode can be automatically selected based on the air-conditioning load and the necessary cooling capacity, the refrigerant cycle system can be effectively operated while the waste heat from the engine-cooling water can be effectively used.

When the pressure of refrigerant flowing into the nozzle 31 of the ejector pump 30 becomes equal to or higher than the critical pressure of the refrigerant, the loss energy in the decompression operation becomes larger, and the recovery pumping energy of the ejector pump 30 is increased. Therefore, as shown in FIG. 5, even when the outside air temperature TAM is about equal to or higher than 35° C., the necessary cooling capacity Q(N) can be obtained only by using the ejector pump 30. That is, in the refrigerant cycle system where the high-pressure side refrigerant pressure becomes higher than the critical pressure of the refrigerant, the operation effect of the present invention can be more improved.

Figure 6A:
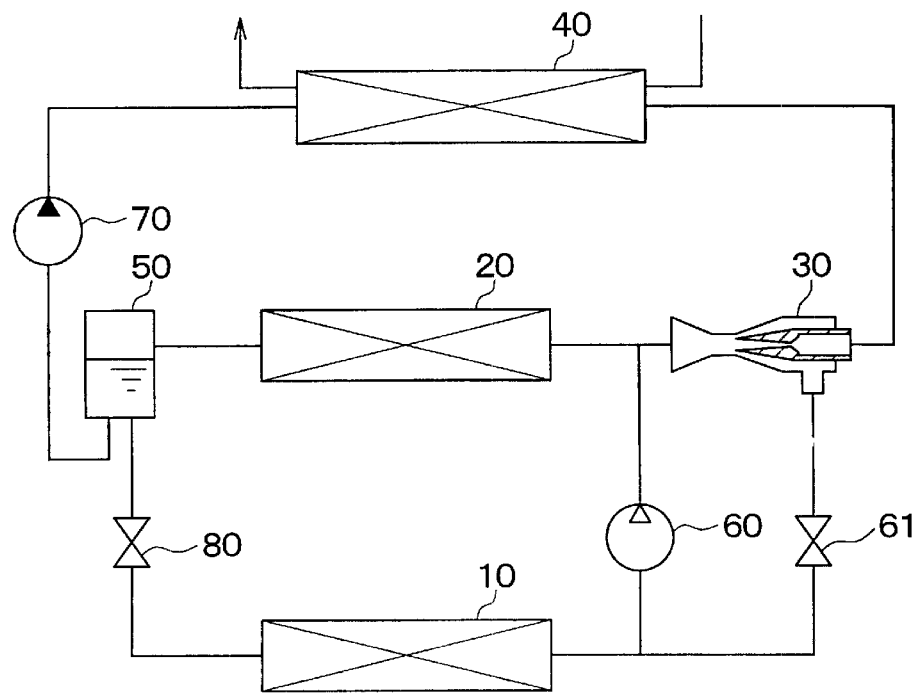
FIG. 6A is a schematic diagram showing a refrigerant cycle system according to a second preferred embodiment of the present invention.

A second preferred embodiment of the present invention will be now described with reference to FIGS. 6A and 6B. In the second embodiment, as shown in FIG. 6A, a switching valve 61 for opening and closing a refrigerant passage between the evaporator 10 and the ejector pump 30 is added. As shown in FIG. 6A, the compressor 60 and the ejector pump 30 are provided in parallel relative to the refrigerant flow from the evaporator 10 to the radiator 20, similarly to the above-described first embodiment. In the example of FIG. 6A, the one of the first mode, the second mode and the third mode can be accurately selected by the switching operation of the switching valve 61. Even in this case, the same effects described in the first embodiment can be obtained.

Figure 6B:
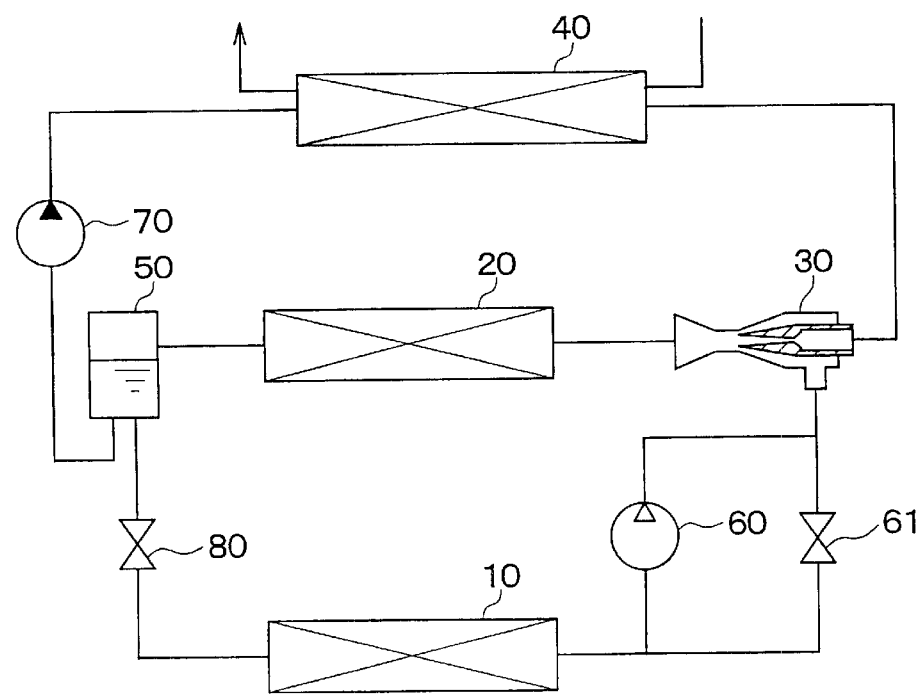
FIG. 6B is a schematic diagram showing a refrigerant cycle system according to the second embodiment.

Alternatively, as shown in FIG. 6B, the compressor 60 and ejector pump 30 can be provided in series in the refrigerant flow from the evaporator 10 to the radiator 20. Further, the switching valve 61 is provided in a refrigerant passage connecting the evaporator 10 and the ejector pump 30. In this case, the switching valve 61 and the compressor 60 are provided in parallel in the refrigerant flow between the evaporator 10 and the ejector pump 30. When the operation of the compressor 60 is unnecessary, the switching valve 61 is opened, so that refrigerant circulates from the evaporator 10 toward the radiator 20 only by the operation of the ejector pump 30 while bypassing the compressor 60. On the other hand, when the operation of the compressor 60 is necessary, the switching valve 61 is opened or closed, so that refrigerant circulates from the evaporator 10 toward the radiator 20 at least by the operation of the compressor 10. In the second embodiment, the other parts are similar to those of the above-described first embodiment. Therefore, the advantage similar to that of the first embodiment can be obtained.

Figure 7:
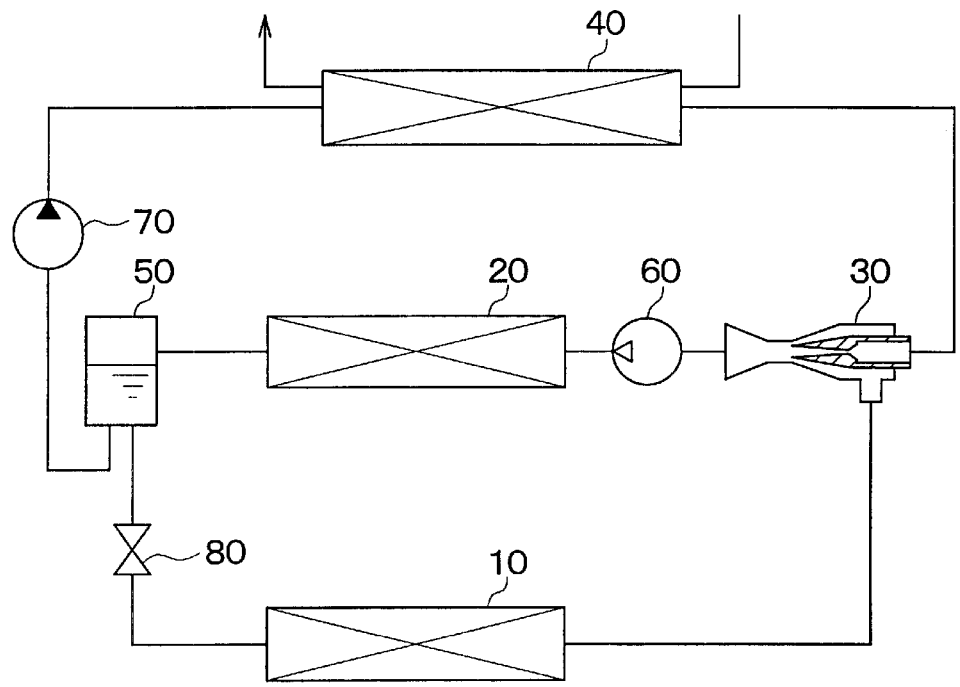
FIG. 7 is a schematic diagram showing a refrigerant cycle system according to a third preferred embodiment of the present invention.
Figure 8:
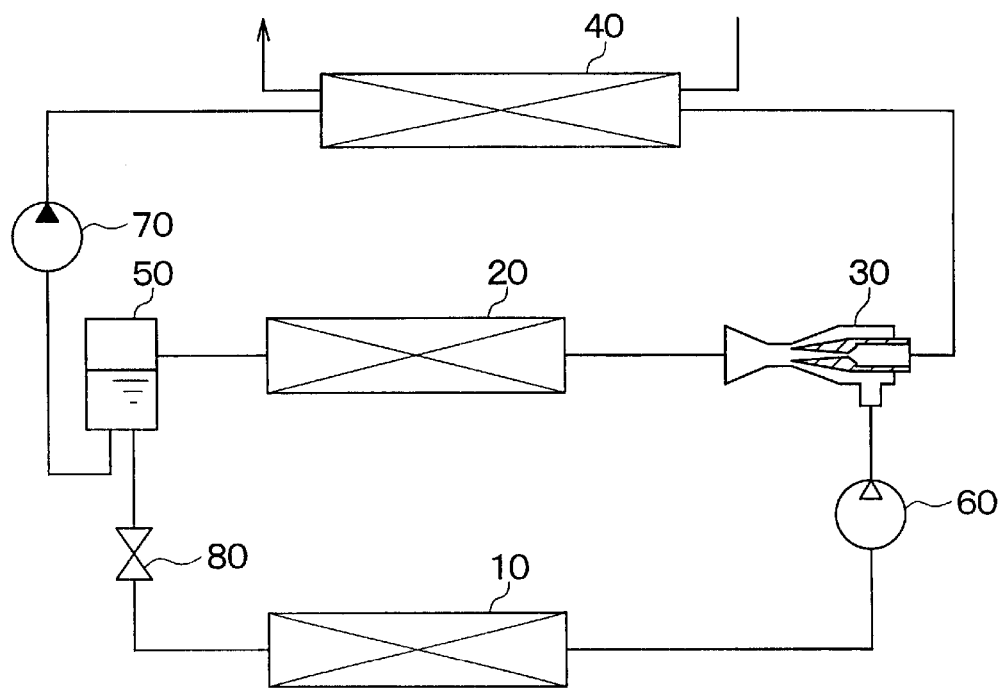
FIG. 8 is a schematic diagram showing a refrigerant cycle system according to the third embodiment.

A third preferred embodiment of the present invention will be now described with reference to FIGS. 7 and 8. In the above-described first embodiment, the ejector pump 30 and the compressor 60 that have the pump functions are disposed in parallel relative to the refrigerant flow from the evaporator 10 toward the radiator 20. However, in the third embodiment, as shown in FIGS. 7 and 8, the compressor 60 and the ejector pump 30 are arranged in series relative to the refrigerant flow from the evaporator 10 to the radiator 20, as shown in FIGS. 7 and 8. In FIG. 7, a refrigerant suction side of the compressor 60 is connected to a refrigerant discharge side of the ejector pump 30. On the other hand, in FIG. 8, the refrigerant discharge side of the compressor 60 is connected to the refrigerant suction side of the ejector pump 30. Even in the third embodiment, one of the first mode, the second mode and the third mode can be selectively switched based on air conditioning load, the necessary cooling capacity and the waste heat amount and the like.

In FIGS. 7 and 8, a bypass passage through which refrigerant bypasses the compressor 60 can be provided, and the switching valve 61 can be provided in the bypass passage, similarly to the above-described second embodiment. In this case, when the operation of the compressor 60 is unnecessary, the switching valve 61 is opened so that refrigerant bypasses the compressor 60 through the bypass passage. Accordingly, when the compressor 60 is unnecessary, it can prevent the refrigerant flow resistance from being increased in the compressor 60.

In the third embodiment, the other parts are similar to those of the above-described first embodiment.

Figure 9:
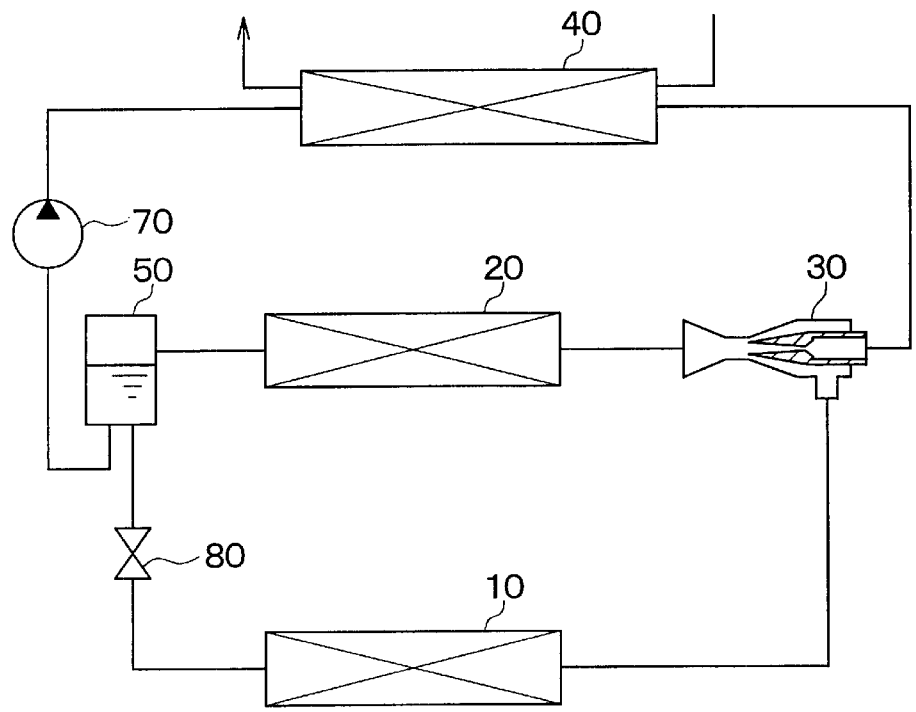
FIG. 9 is a schematic diagram showing a refrigerant cycle system according to a fourth preferred embodiment of the present invention.

A fourth preferred embodiment of the present invention will be now described with reference to FIG. 9. In the fourth embodiment, carbon dioxide is used as the refrigerant, for example, so that the pressure of the refrigerant flowing into the nozzle 31 of the ejector pump 30 is set equal to or higher than the critical pressure of the refrigerant. In this case, the loss energy in the decompression and expansion in the ejector pump 30 becomes larger, and recovered pumping energy is increased in the ejector pump 30. Thus, even when the outside air temperature TAM is about equal to or higher than 35° C., the necessary cooling capacity can be sufficiently obtained only by the operation of the ejector pump 30. Accordingly, in the fourth embodiment, the compressor can be omitted in the refrigerant cycle system, and refrigerant circulates from the evaporator 10 toward the radiator 20 only by using the ejector pump 30. In the fourth embodiment, the other parts are similar to the above-described first embodiment.

A fifth preferred embodiment of the present invention will be described with reference to FIGS. 10–12. In the above-described embodiments, the refrigerant to be introduced into the evaporator 10 is decompressed and expanded in the decompression unit 80 in iso-enthalpy. That is, the iso-enthalpy expansion is performed in the expansion valve 80. However, in the fifth embodiment, an another ejector pump 90 having the same structure as the ejector pump 30 is used instead of the decompression unit 80, and the gas-liquid separator 50 is provided at a refrigerant outlet side of the ejector pump 90. In the fifth embodiment, the ejector pump 30 is defined as a first ejector pump 30, and the ejector pump 90 is defined as a second ejector pump 90.

In the fifth embodiment, the loss energy in the decompression and expansion of the decompression unit 80 can be recovered in the second ejector pump 90 as the pumping energy. Therefore, the loss energy in the decompression and expansion can be further recovered, and efficiency of the refrigerant cycle system can be further improved.

Figure 10:
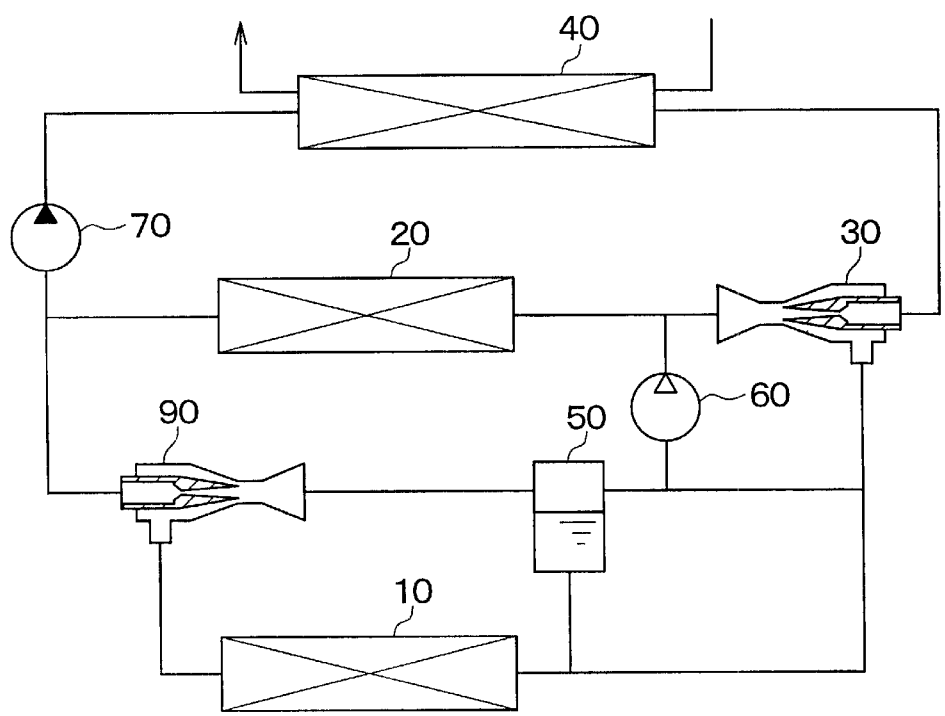
FIG. 10 is a schematic diagram showing a refrigerant cycle system according to a fifth preferred embodiment of the present invention.

FIG. 10 shows a refrigerant cycle system in which the second ejector pump 90 is used instead of the decompression unit 80 in the refrigerant cycle system in FIG. 1. In this case, as described above, the gas-liquid separator 50 is disposed at the refrigerant outlet side of the second ejector pump 90.

Figure 11:
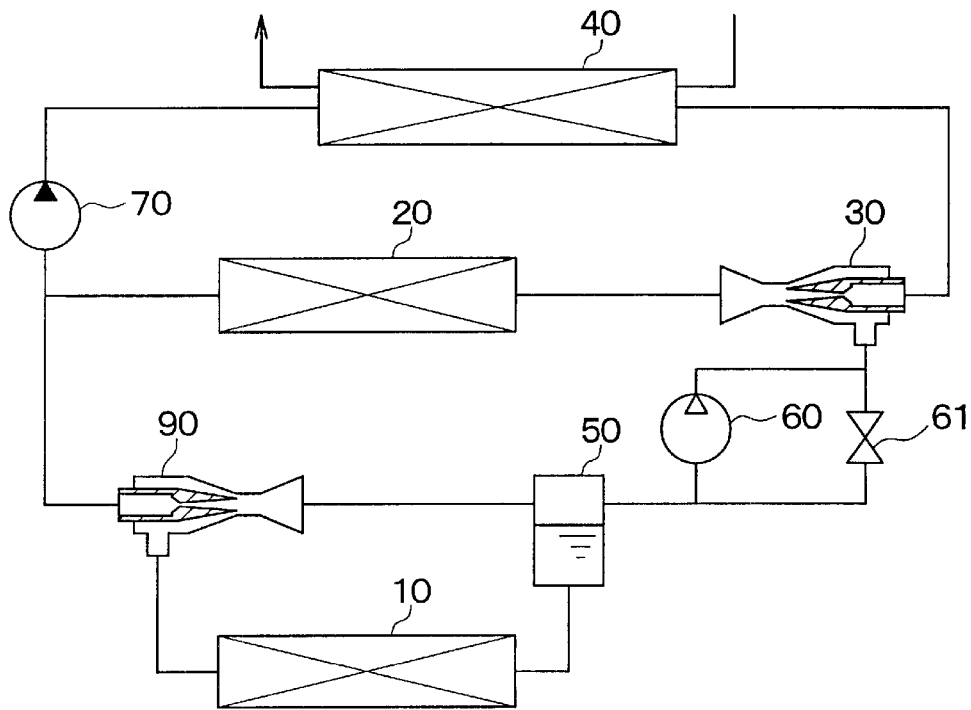
FIG. 11 is a schematic diagram showing a refrigerant cycle system according to the fifth embodiment.

FIG. 11 shows a refrigerant cycle system in which the second ejector pump 90 is used instead of the decompression unit 80 in the refrigerant cycle system in FIG. 6B. Further, the gas-liquid separator 50 is disposed at the refrigerant outlet side of the second ejector pump 90.

Figure 12:
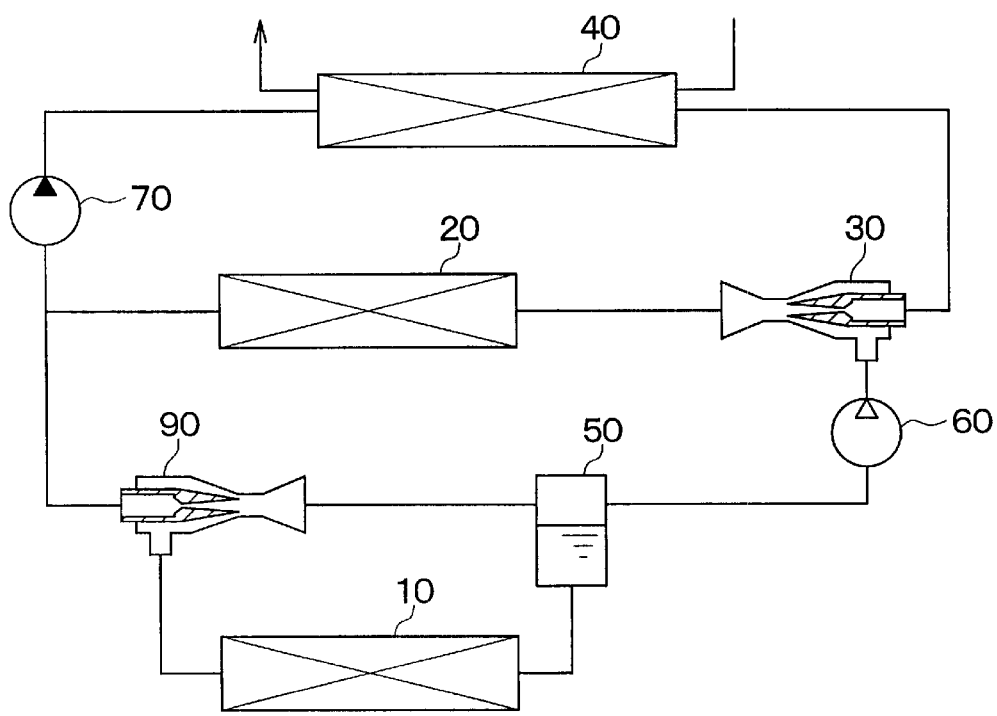
FIG. 12 is a schematic diagram showing a refrigerant cycle system according to the fifth embodiment.

FIG. 12 shows a refrigerant cycle system in which the second ejector pump 90 is used instead of the decompression unit 80 in the refrigerant cycle system in FIG. 8. Further, the gas-liquid separator 50 is disposed at the refrigerant outlet side of the second ejector pump 90.

In the fifth embodiment, the other parts are similar to those of the above-described embodiments, and the detail explanation thereof is omitted. Accordingly, in the fifth embodiment, the advantages described in FIGS. 1, 6B and 8 of the above embodiments can be obtained.

A sixth preferred embodiment of the present invention will be described with reference to FIG. 13. In the above-described first embodiment, the liquid refrigerant separated in the gas-liquid separator 50 is supplied to the heat exchanger 40 by the refrigerant pump 70. However, in the sixth embodiment, gas refrigerant is supplied to the heat exchanger 40.

Figure 13:
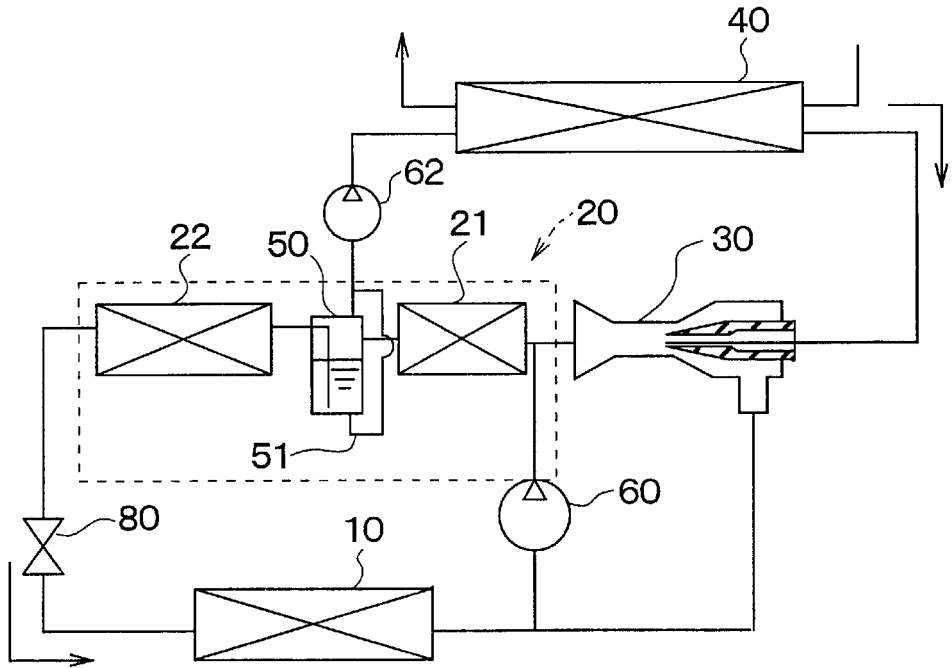
FIG. 13 is a schematic diagram showing a refrigerant cycle system according to a sixth preferred embodiment of the present invention.

Specifically, as shown in FIG. 13, a radiator 20 is divided into a first radiator 21 and a second radiator 22, and the gas-liquid separator 50 is provided in a refrigerant passage between the first radiator 21 and the second radiator 22. Further, the gas-liquid separator 50 is disposed, so that the gas refrigerant is supplied from the gas-liquid separator 50 while being branched from the radiator 20, and is press-sent to the heat exchanger 40 by a second compressor 61.

An oil returning circuit 51 is provided so that lubrication oil separated in the gas-liquid separator 50 is supplied to a refrigerant suction side of the compressor 61. Generally, the lubrication oil is supplied to the compressors 60, 61 for lubricating sliding portions in the compressors 60, 61.

In the sixth embodiment, both the compressor 61 and the compressor 60 are operated by the vehicle engine. However, at least one of the compressor 61 and the compressor 60 can be driven by an electrical motor or a thermal energy such as waste heat.

According to the sixth embodiment, gas refrigerant can be supplied to the heat exchanger 40 by the gas-liquid separator 50 and the compressor 61. Therefore, it is unnecessary to use the heat for boiling and evaporating the liquid refrigerant in the heat exchanger 40, and a large amount pumping energy can be recovered from the waste heat in the heat exchanger 40.

In addition, gas refrigerant to be supplied to the heat exchanger 40 is compressed and thermal-increased in the compressor 61. Therefore, high-temperature high-pressure super-boiled vapor refrigerant can be discharged from the heat exchanger 40 while the size of the heat exchanger 40 can be made smaller. Even in the sixth embodiment, one of the first mode, the second mode and the third mode can be automatically selected based on the thermal load of the evaporator 10 and the like.

Figure 14:
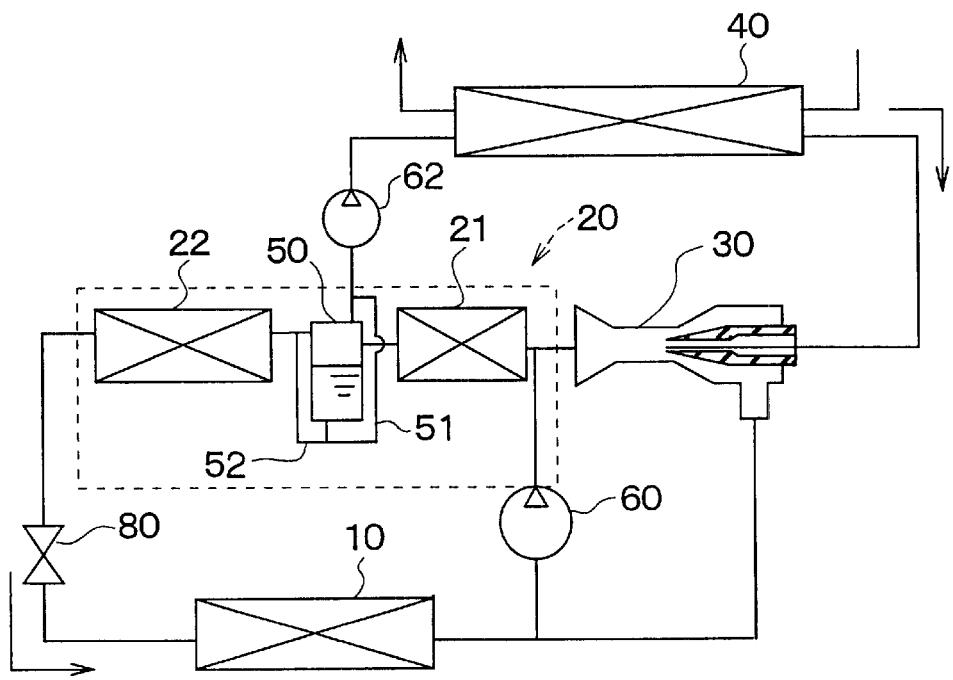
FIG. 14 is a schematic diagram showing a refrigerant cycle system according to a seventh preferred embodiment of the present invention.

A seventh preferred embodiment of the present invention will be now described with reference to FIG. 14. The seventh embodiment is a modification of the above-described sixth embodiment. In the seventh embodiment, the refrigerant suction side of the compressor 61 is connected to a refrigerant passage connecting the gas-liquid separator 50 and the second radiator 22. In the seventh embodiment, the other parts are similar to those of the above-described sixth embodiment, and the effects described in the sixth embodiment can be obtained.

Although the present invention has been fully described in connection with the preferred embodiments thereof with reference to the accompanying drawings, it is to be noted that various changes and modifications will become apparent to those skilled in the art.

For example, in the above-described embodiments, the evaporator 10 of the present invention is typically used for the vehicle air conditioner, for cooling the passenger compartment. However, the evaporator 10 of the present invention can be used for cooling a battery mounted on a vehicle. That is, the refrigerant cycle system with the ejector pump 30 can be used as a cooling device for cooling a heat-generating member such as the battery.

In the above-described embodiments, carbon dioxide is used as the refrigerant so that the high-pressure side refrigerant pressure in the refrigerant cycle system can be made higher than the critical pressure of the refrigerant. However, a general refrigerant such as fluorocarbon (e.g., R134a) can be used. Further, a hydrocarbon group refrigerant such as ethylene and ethane, nitric oxide and propane can be also used as the refrigerant. Alternatively, a mixed refrigerant, where at least two different refrigerants are mixed, can be used as the refrigerant.

When the fluorocarbon, the hydrocarbon group refrigerant or the mixed refrigerant is used as the refrigerant in the refrigerant cycle system, it is unnecessary to increase the pressure of the refrigerant flowing into the nozzle 31 to the critical pressure of the refrigerant. As shown in FIG. 5, even in the vehicle air conditioner where R134a is used as the refrigerant, when the outside air temperature is about equal to or lower than 30° C., sufficient cooling capacity can be obtained even when refrigerant circulates from the evaporator 10 toward the radiator 20 only by the ejector pump 30.

In the above-described embodiments, a control unit (ECU) for controlling operation of the refrigerant cycle system is not indicated. However, actually, the control unit is provided for controlling the operation of the refrigerant cycle system. In this case, one of the first mode, the second mode and the third mode can be automatically selected by the control unit based on the thermal load of the evaporator 10 and the like.

Such changes and modifications are to be understood as being within the scope of the present invention as defined by the appended claims.

What is claimed is:

1. A refrigerant cycle system, comprising:
   an evaporator that has a cooling capacity by evaporating refrigerant therein;
   a radiator for cooling refrigerant flowing from the evaporator;
   an ejector pump including a nozzle for converting a pressure energy of refrigerant to a speed energy thereof so that the refrigerant is decompressed and expanded, the ejector pump being disposed to suck refrigerant from a side of the evaporator and to discharge the sucked refrigerant toward the radiator by a refrigerant stream jetted from the nozzle;
   a compressor for compressing refrigerant, the compressor being disposed to suck refrigerant from the side of the evaporator and discharge the sucked refrigerant toward the radiator; and
   a heating unit for heating refrigerant to be introduced into the nozzle, wherein:
      the ejector pump and the compressor are disposed to select any one of a first mode where refrigerant circulates from the evaporator toward the radiator only by the ejector pump, a second mode where refrigerant circulates from the evaporator toward the radiator only by the compressor, and a third mode where refrigerant circulates from the evaporator toward the radiator by both the ejector pump and the compressor.

2. The refrigerant cycle system according to claim 1, wherein the compressor has a refrigerant discharge port that is coupled to a refrigerant suction port of the ejector pump.

3. The refrigerant cycle system according to claim 1, wherein the compressor and the ejector pump are disposed in series, relative to a refrigerant flow from the evaporator to the radiator.

4. The refrigerant cycle system according to claim 3, further comprising
   a switching valve for opening and closing a bypass passage through which refrigerant from the evaporator flows toward the radiator while bypassing the compressor.

5. The refrigerant cycle system according to claim 1, wherein the compressor and the ejector pump are disposed in parallel, relative to a refrigerant flow from the evaporator to the radiator.

6. The refrigerant cycle system according to claim 5, further comprising
   a switching valve for opening and closing a bypass passage through which refrigerant from the evaporator flows toward the radiator while bypassing the compressor.

7. The refrigerant cycle system according to claim 1, further comprising
   a gas-liquid separator for separating refrigerant from the radiator into gas refrigerant and liquid refrigerant; and
   a refrigerant pump for circulating refrigerant from the gas-liquid separator toward the nozzle of the ejector after passing through the heating unit.

8. The refrigerant cycle system according to claim 7, wherein the refrigerant pump is disposed to suck mainly liquid refrigerant from the gas-liquid separator.

9. The refrigerant cycle system according to claim 7, wherein the refrigerant pump is disposed to suck mainly gas refrigerant from the gas-liquid separator.

10. The refrigerant cycle system according to claim 1, wherein the refrigerant flowing from the heating unit to the nozzle of the ejector pump has a pressure equal to or higher than the critical pressure of the refrigerant.

11. The refrigerant cycle system according to claim 1, wherein one of carbon dioxide, fluorocarbon, hydrocarbon and a mixture refrigerant is used as the refrigerant.

12. The refrigerant cycle system according to claim 1, wherein the evaporator is disposed to cool air to be blown into a compartment, for cooling the compartment.

13. The refrigerant cycle system according to claim 1, wherein the evaporator is disposed to cool a heat-generating member that generates heat when being operated.

14. The refrigerant cycle system according to claim 13, wherein the heat-generating member is a battery mounted on a vehicle.

15. The refrigerant cycle system according to claim 1, wherein the heating unit is disposed to heat the refrigerant using hot water from a vehicle engine as a heating source.

* * * * *